US012299541B2

United States Patent
Arun et al.

(10) Patent No.: US 12,299,541 B2
(45) Date of Patent: May 13, 2025

(54) MODEL INSIGHTS FRAMEWORK FOR PROVIDING INSIGHT BASED ON MODEL EVALUATIONS TO OPTIMIZE MACHINE LEARNING MODELS

(71) Applicant: ADOBE INC., San Jose, CA (US)

(72) Inventors: Sathya Arun, Fremont, CA (US); Nirmal Mani, Sunnyvale, CA (US); Ashok Pancily Poothiyot, San Jose, CA (US)

(73) Assignee: Adobe Inc., San Jose, CA (US)

(*) Notice: Subject to any disclaimer, the term of this patent is extended or adjusted under 35 U.S.C. 154(b) by 699 days.

(21) Appl. No.: 16/419,737

(22) Filed: May 22, 2019

(65) Prior Publication Data

US 2020/0372307 A1 Nov. 26, 2020

(51) Int. Cl.
*G06N 20/00* (2019.01)
*G06F 3/0482* (2013.01)
*G06F 9/54* (2006.01)
*G06F 18/21* (2023.01)
*G06F 18/40* (2023.01)

(52) U.S. Cl.
CPC .......... *G06N 20/00* (2019.01); *G06F 3/0482* (2013.01); *G06F 9/541* (2013.01); *G06F 18/2178* (2023.01); *G06F 18/40* (2023.01); *G06F 2218/12* (2023.01)

(58) Field of Classification Search
CPC ............ G06K 9/6263; G06K 9/00536; G06K 9/6253; G06F 3/0482; G06F 9/541; G06N 20/00

See application file for complete search history.

(56) References Cited

U.S. PATENT DOCUMENTS

| | | | |
|---|---|---|---|
| 2018/0314617 A1* | 11/2018 | Khosrowpour | G06F 11/3089 |
| 2019/0026278 A1* | 1/2019 | Abedin | G06F 40/169 |
| 2019/0279114 A1* | 9/2019 | Deshpande | G06N 20/00 |
| 2020/0026640 A1* | 1/2020 | Dhanaraj | G06F 11/3684 |
| 2020/0097390 A1* | 3/2020 | Gunter | G06F 11/3684 |
| 2020/0151588 A1* | 5/2020 | Doan Huu | G06N 20/00 |
| 2020/0272112 A1* | 8/2020 | Carullo | G06N 20/20 |
| 2020/0272426 A1* | 8/2020 | Fu | G06N 7/005 |

* cited by examiner

Primary Examiner — Cesar B Paula
Assistant Examiner — John M Heffington
(74) Attorney, Agent, or Firm — Shook, Hardy & Bacon L.L.P.

(57) ABSTRACT

Methods and systems are provided for evaluating providing insight into complex machine learning models to facilitate optimization of the models at scale. In particular, a system can guide and/or implement model training and evaluation in various machine learning environments. Further, the system is capable of using standardized evaluation metrics to provide insight into the success of iterations of a machine learning model. Additionally, the system allows for presenting visualizations based on such evaluation metrics to facilitate gaining insight into one or more machine learning models and/or instances of a machine learning model.

20 Claims, 10 Drawing Sheets

FIG. 7A

Data Science Workspace > Product Purchase Prediction 1 >

Experiment 1

Home  Data  Data Model  United Profile  Data Science  Service Gallery (View Activity Logs)  (Score)  (View Service)

Evaluation Metrics  Feature Mapping  Configuration Details  Scoring Runs

Training Parameters  Scoring Parameters

| KEY | VALUE |
|---|---|
| azureBlobContainerWorkshop | fs.azure.account.key.empbeats.blob.core.windows.net |
| azureKeyUserWorkshop | OgOwtONtXl7w9pQMRkhYHesVsmSwAC7PAEpYuzd2l2z6KwmUv93Yx9pEtdgwLh1xVOIum2e2P3rG8YWVQA0gQ== |
| readDataFrom | datasets |
| env | prod |
| IMS_ORG_ID | EDA8E86ES9373051l0A495EFA@AdobeOrg |
| scoringOutputDataSetId | 5aafe64040085501d67a638d |
| AAM | false |
| writeOutputTo | blob |
| productName | Osprey Atmos 85 AG Pack |
| productDept | Hiking Backpacks |

FIG. 7C

MODEL INSIGHTS FRAMEWORK FOR PROVIDING INSIGHT BASED ON MODEL EVALUATIONS TO OPTIMIZE MACHINE LEARNING MODELS

BACKGROUND

Data scientists (e.g., users of data analytics systems) often desire to gain insight from data. To this end, users can build machine learning models that are able to process data and generate outputs. Successful machine learning models can provide detailed information related to the data (e.g., data obtained from one or more customers and/or related to one or more products). The machine learning process is iterative. In the machine learning process, a user begins with a prototype of a model (e.g., an algorithm to perform some logic with set of parameters and/or features). Throughout the machine learning process, such a model can be updated (e.g., by modifying the algorithm, model parameters, features, and/or updating for error). However, understanding and gaining insight into machine learning models, for example, to determine how to update the model, is a difficult and time consuming task. In particular, tracking successes and/or failures between different versions of a machine learning model is challenging.

Conventional methods for tracking machine learning models have been developed. Such conventional methods allow for publishing data related to machine learning models (e.g., data collected for machine learning models that have been run). This data can be used in an attempt to visualize differences between machine learning models. In particular, a visual interface can allow users to observe data from one or more machine learning models and/or iterations of a single machine learning model. However, the data collected using conventional methods often is not standardized. Failing to collect standardized data can create difficulties in visualizing differences between the machine learning models. For instance, if collected data varies from model to model, it can be difficult to ensure the models are being accurately compared.

In addition, such conventional methods require users to manually author the code for an entire machine learning model. For instance, users typically must manually author code for collecting evaluation metrics that can be used to assess the success of a machine learning model. Manually authoring code related to evaluation metrics can require an experienced data scientist to determine the best evaluation metrics to apply to a particular machine learning model (e.g., based on the algorithm type). Further, manually authoring code related to evaluation metrics can exacerbate failure to collect standardized data for machine learning models.

Further, such conventional methods are oftentimes not successful in solving the problem of enterprise management. For instance, conventional methods are often not scalable or extensible for use by various clients (e.g., each client being a different organization having hundreds or thousands of experiments, each experiment having multiple metrics). In particular, the underlying storage and architecture often does not allow for scale. In addition, conventional methods are not compatible across authoring platforms. In particular, to analyze the machine learning model in various authoring languages, the code of the model is often converted into a different language used to analyze the model (e.g., using a thrift interface). Such conversions can lead to extensibility issues with conventional methods. Further, such conventional methods cannot be integrated with other systems (i.e., they cannot be implemented as a plug-in). Accordingly, such conventional methods often fail to provide data scientists with a system capable of building, evaluating, and providing insight into complex machine learning models to optimize the models at scale.

SUMMARY

Embodiments of the present disclosure are directed towards facilitating the gaining insight into machine learning models. In accordance with embodiments, an insights system can be provided as part of a cross-platform, extensible, pluggable system that allows for assessment of machine learning models using standardized evaluation metrics. Advantageously, such a model insights system can provide insight into instances of a machine learning model to aid a user in determining how to best optimize the model. For instance, using standardized evaluation metrics can allow a user to gain insight into how to efficiently optimize a complex machine learning model by comparing the success of instances of the machine learning model. The model insights system can further provide rich visualizations related to the success of various machine learning model instances. In this way, such a model insights system can empower data scientists to quickly build effective and performant machine learning models at scale.

In operation, a user can provide and/or build a machine learning model that can be combined with runtime code used obtain standardized evaluation metrics for the model. Such runtime code can be provided by the insights platform across various platforms (e.g., based on various authoring languages and/or machine learning model types). The runtime code provided by the insights system can be implicit runtime code or explicit runtime code. In embodiments using implicit runtime code, evaluation code can be integrated into the code of a machine learning model to generate evaluation metrics related to the model when an experiment is run using the machine learning model. In embodiments using explicit runtime code, evaluation code can be executed alongside machine learning model code run during an experiment to extract evaluation metrics related to the model. In instances, the explicit runtime code can be co-located code (e.g. provided using a plug-in). In this way, evaluation metrics can be received or extracted from an experiment running a machine learning model instance.

Standardized evaluation metrics can be received or extracted by the insights system. The standardized evaluation metrics can be used to provide insight into instances of a machine learning model. Such insight can allow a user to evaluate the success (or failure) of various machine learning model instances. An instance of a machine learning model can be created based on a variation of a built model by modifying configurations of the model. Such configurations can be related to model parameters, such as, for example, data used to train the model, features (e.g., related to input/output of the model), and hyperparameters of the model. An instance can be run using an experiment during which the evaluation metrics can be collected or extracted. The standardized evaluations metrics related to different model instances can then be used to evaluate the success of the various instances. In particular, insight into a model can be provided by using evaluation metrics to compare iterations of the machine learning model. Presenting and/or analyzing the evaluation metrics can provide insight into the machine learning model instances (e.g., accuracy of a model, precision of a model, etc.). In some embodiments, visualizations can be used to facilitate insight into a model. Such visualizations can present the collected evaluation metrics. Visualizations can be provided using, for example, a visual interface (e.g., user interface). Such a visual interface can allow users to look at the results from one or more machine learning model and/or one or more iterations of a single machine learning model.

BRIEF DESCRIPTION OF THE DRAWINGS

FIGS. 7A-7C depict an illustrative model insights system for evaluating, optimizing, and providing insight for complex machine learning models at scale, in accordance with embodiments of the present disclosure.

DETAILED DESCRIPTION

Figure 1A:
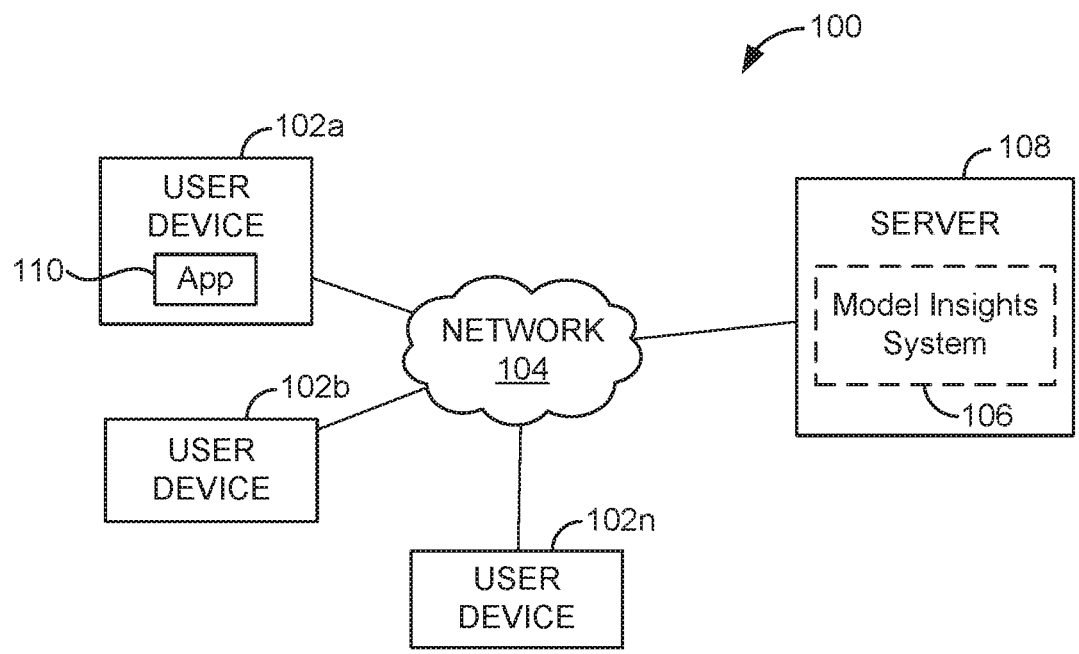
FIG. 1A depicts an example configuration of an operating environment in which some implementations of the present disclosure can be employed, in accordance with various embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "machine learning model" generally refers to a mathematical model based on training data that can generate output (e.g., predictions or decisions) without being explicitly programmed to perform a task. A machine learning model can be based on an algorithm comprised of logic for loading data, logic for training, logic for evaluating, and/or logic for scoring. A machine learning model can be implemented using one or more coded functions, which may be written in a particular machine learning environment using an authoring language (e.g., Scala, R, Python, TensorFlow, etc.). Machine learning model types include regression, binary classification, multi-class classification clustering (with ground truth), clustering (without ground truth), recommendation, TensorFlow use cases, error capture mechanisms, and others (that deviate from a provided list of machine learning algorithm types).

The term "model insights system" generally refers to a platform that allows users to evaluate machine learning models. The model insights system can generally be used to evaluate and provide insight into complex machine learning models to optimize models at scale. In particular, the model insights system can provide a framework for experimenting to fine-tune models by collecting evaluation metrics for the models. In accordance with embodiments described herein, the model insights system implemented as a framework can further provide rich insight visualizations.

The term "model instance" generally refers to a variation of a machine learning model created by modifying configurations of the built model. Such configurations can relate to model parameters, such as, for example, data used to train the model, features (e.g., related to input/output of the model), and hyperparameters of the model. In this way, evaluation metric results related to a machine learning model instance can be received (e.g., from implicit runtime code) or extracted (e.g., from explicit runtime code) based on output from an experiment to train an instance of a machine learning model The term "evaluation metrics" generally refers to metrics used evaluate various aspects of a machine learning model (e.g., accuracy, precision, loss, etc.). Specific evaluation metrics can be best suited to particular machine learning models.

The term "insights" generally refers to understanding that can be gained information (e.g., evaluation metrics) related to a machine learning model. For instance, insight can be provided based on raw evaluation metrics of one or more instances of a machine learning model (e.g., accuracy of the model, precision of the model, etc.). In other instances insight can be provided using visualizations based on the evaluation metrics related to one or more instances of a machine learning model.

Oftentimes, a user desires to gain insight into data using machine learning models. To create a machine learning model capable of providing insight into data requires a model to be built and updated until an ideal model is created. Determining when an ideal model is created can be performed by tracking successes and/or failures between different versions of a machine learning model. Initially, a machine learning model is created by a user. When creating the machine learning model, users often have a preferred language for writing the machine learning model. However, conventional systems that assess machine learning models are typically only compatible across different languages by converting the languages to the language used to assess the models. This can result in limitations to extensibility of the conventional systems to support multiple languages. In addition, conventional systems often are tailored to experienced data scientists having a high level of knowledge related to building machine learning models. For instance, conventional systems often require manual authoring the entire set of code used to build a model (e.g., code for loading data, code for training, code for evaluating, and/or code for scoring). In particular, conventional systems require manually authoring code indicating the evaluation metrics that will be used to evaluate the model. Manually authoring code related to evaluation metrics is a difficult task, even for experienced data scientists. Manually authoring code can result in conventional systems failing to gather evaluation metrics that will provide insights consistent across iterations of a model. In addition, such conventional systems are not successful in solving the problem of enterprise management. For instance, models generated using conventional systems are not scalable for use by various clients because of underlying storage and architecture. Further, such conventional methods cannot be integrated with other systems (i.e., they cannot be implemented as a plug-in). As such, conventional systems often fail to allow data scientists to obtain insight from optimally evaluated complex machine learning models at scale.

Accordingly, at a high level, embodiments of the present disclosure are directed to a model insights system that is a cross-platform, extensible, pluggable system that allows for assessment of machine learning models using standardized evaluation metrics. In particular, and as described herein, the model insights system is capable of providing runtime code to generate standardized metrics that can allow insight into complex machine learning models. For instance, the system can collect standardized evaluation metrics in relation to a machine learning model. In embodiments, the system can provide a cross-platform framework that supports multiple authoring languages (e.g., using a REST architecture). Such a system providing a cross-platform can be extensible. In some embodiments, the cross-platform framework of the system can provide implicit or explicit runtime code related to the standardized evaluations metrics for a particular model (e.g., using a plug-in). The system can also receive and/or extract evaluation metrics collected from iterations of a machine learning model (e.g., via an insights service). Additionally, the system can allow for presenting visual insights based on the evaluation metrics related to one or more machine learning models and/or instances of a machine learning model (e.g., via a user interface). For example, visualizations can be provided using, for example, a visual interface (e.g., user interface). Such a system can reduce the amount of time and effort spent authoring, modifying, and understanding iterations of a machine learning model (e.g., experiments run on instances of the machine learning model).

In one embodiment, the model insights system can be comprised of a cross-platform insights SDK embedded in a runtime framework, an insights service, and a visualization interface. The cross-platform insights SDK can be embedded as part of a runtime framework for multiple machine learning environments (e.g., based on various authoring languages). The insights SDK can allow a user to select and/or build machine learning models in a variety of authoring languages. The runtime framework can be used to automatically extract relevant information (e.g., evaluation metrics) from a machine learning model and pass the information to the insights service. The insights service can be a backend service that defines key abstractions to persistence related to information received from the runtime framework. For instance, the insights service can define information about a machine learning model that should be stored. Such information can be various machine learning model instances along with metadata and collected evaluation metrics for the instances. The visualization interface can be a web-based visualization interface. The visualization interface can dynamically adapt for iterations of a machine learning model (e.g., using stored information related to a machine learning model). In this way, the visualization interface can provide an easy-to navigate visualizations that provide insight into iterations of the machine learning model.

In further detail, the cross-platform insights SDK embedded in the runtime framework can be used to provide standardized runtime code for evaluating a machine learning model. In some embodiments, the model machine learning can be authored by a user. In particular, a user can author code that comprises the machine learning model. Such code can comprise logic for building the machine learning model (e.g., logic for loading data, logic for training, etc.). Such a machine learning model can be combined with standardized runtime code (e.g., for evaluating the model). The machine learning model can be combined with either implicit or explicit runtime code for evaluating the model. In embodiments using implicit runtime code, code-driven evaluation can be integrated into the code of a built model to generate evaluation metrics related to the model. In embodiments using explicit runtime code, code-driven evaluation can executed alongside code of a built model to extract evaluation metrics related to the model. As an example, explicit runtime code can be provided as co-located code provided, for example, from a plug-in.

Such standardized runtime code can be based on various authoring languages and/or machine learning model types. For instance, when authoring a model, the model can be configured using model type and authoring language. The model insights system can use this model type and authoring language to select logic for optimally evaluating the model. In some instances, a user can indicate the model type and authoring language. The indicated model type and authoring language can then be used to determine and provide code for logic for evaluating a model.

The combined code (e.g., using implicit or explicit runtime code for evaluating the mode) can be used during experiments of model instances such that the backend insights service can either receive and or extract evaluation metrics related to the model instances. An instance of the machine learning model can be based on variations created by modifying configurations of the built model. Such configurations can relate to model parameters, such as, for example, data used to train the model, features (e.g., related to input/output of the model), and hyperparameters of the model. In this way, evaluation metric results related to a machine learning model instance can be received (e.g., from implicit runtime code) or extracted (e.g., from explicit runtime code) based on output from an experiment to train an instance of a machine learning model.

To compare instances of the machine learning model, insights can be generated. In embodiments, the backend insights service can generate the insights. Insights can be based on the different evaluations collected for a machine learning model (e.g., for various instances of the model). For example, evaluation metric results can be presented and/or further analyzed to provide insight into the machine learning model (e.g., accuracy of the model, precision of the model, accuracy of the model, etc.).

In embodiments, such evaluation metrics and/or insights can be provided using visualizations. Visualizations can be provided, for example, via a visual interface (e.g., user interface). Such a visual interface can allow users to look at (e.g., compare) the results from one or more machine learning model and/or one or more iterations of a single machine learning model. In embodiments, visualizations can be provided via an easy-to-navigate user interface (e.g., as a layer on top of a cloud scale database) that permits visual exploration of machine learning models. Visualizations can be based on relevant information (e.g., evaluation metrics) from machine learning model(s). Such relevant information can be logged (e.g., using a data store). In implementations, visualizations can represent the data meaningfully as a reader-board or as a chart. Reader-boards and/or charts can represent different types of metrics for different evaluators (e.g., used to evaluate a machine learning model).

FIG. 1 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1 is an example of one suitable operating environment. Among other components not shown, operating environment 100 includes a number of user devices, such as user devices 102a and 102b through 102n, network 104, and server(s) 108. Each of the components shown in FIG. 1 may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out evaluating and providing insight into instances of complex machine learning models. In some implementations, the application(s) comprises a web application, which can run in a web browser, and could be hosted at least partially on the server-side of environment 100. In addition, or instead, the application(s) can comprise a dedicated application. For example, the application can provide a model insights system as a framework for evaluating complex machine learning models. In some embodiments, the application can provide implicit or explicit runtime code related to what evaluations metrics to collect for a particular model. In embodiments using implicit runtime code, the application can provide code that can be directly integrated into code of a model. The directly integrated code can be used to generate evaluation metrics related to the model. The generated evaluation can then be received by the application to provide insights into the model. In embodiments using explicit runtime code, the application can provide code that can be executed alongside code of a built model. The code executed alongside the model can be used to extract evaluation metrics related to the model. As an example, explicit runtime code can be provided as co-located code. For instance, the co-located code can be implemented using a plug-in. In some cases, the application can be integrated into the operating system (e.g., as a service). In other cases, the application can be run as a plug-in that adds a specific feature (e.g., evaluating and providing insight for complex machine learning models at scale) to an existing application. It is therefore contemplated herein that "application" be interpreted broadly.

As described herein, server 108 can facilitate evaluating and providing insight into instances of machine learning models at scale, using model insights system 106. Server 108 includes one or more processors, and one or more computer-readable media. The computer-readable media includes computer-readable instructions executable by the one or more processors. The instructions may optionally implement one or more components of model insights system 106, described in additional detail below.

For cloud-based implementations, the instructions on server 108 may implement one or more components of model insights system 106, and application 110 may be utilized by a user to interface with the functionality implemented on server(s) 108. In some cases, application 110 comprises a web browser. In other cases, server 108 may not be required. For example, the components of model insights system 106 may be implemented completely on a user device, such as user device 102a. In this case, model insights system 106 may be embodied at least partially by the instructions corresponding to application 110.

Thus, it should be appreciated that model insights system 106 may be provided via multiple devices arranged in a distributed environment that collectively provide the functionality described herein. Additionally, other components not shown may also be included within the distributed environment. In addition, or instead, model insights system 106 can be integrated, at least partially, into a user device, such as user device 102a. Furthermore, model insights system 106 may at least partially be embodied as a cloud computing service.

Figure 1B:
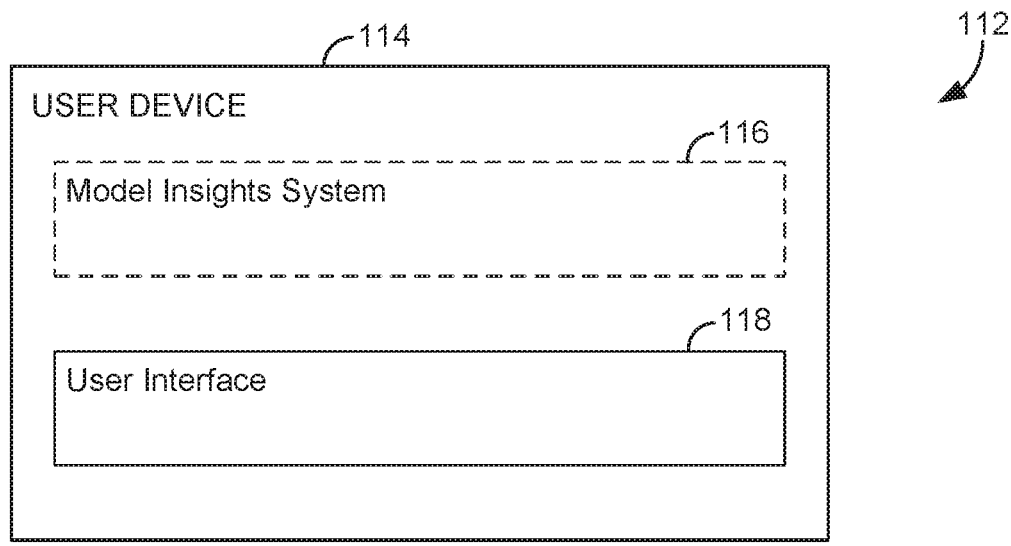
FIG. 1B depicts an example configuration of an operating environment in which some implementations of the present disclosure can be employed, in accordance with various embodiments.

Referring to FIG. 1B, aspects of an illustrative model insights system are shown, in accordance with various embodiments of the present disclosure. FIG. 1B depicts a user device 114, in accordance with an example embodiment, configured to allow for authoring machine learning models and visualizing insights/interpretations related to machine learning models. The user device 114 may be the same or similar to the user device 102a-102n and may be configured to support the model insights system 116 (as a standalone or networked device). For example, the user device 114 may store and execute software/instructions to facilitate interactions between a user and the model insights system 116 via the user interface 118 of the user device.

A user device can be utilized by a user to facilitate interactions with a model insights system. In particular, a user can author a model using model insights system. Model insights can be provided to the user based one or more machine learning models. The user interface may facilitate viewing insights related to one or more machine learning models (e.g., based on collected evaluation metrics).

For instance, model insights system 116 can provide visualizations related to machine learning models. Visualizations can be provided using, for example, a visual interface (e.g., user interface 118). Such a visual interface can allow users to look at (e.g., compare) the results from one or more machine learning model and/or one or more iterations of a single machine learning model. In embodiments, visualizations can be provided via an easy-to-navigate user interface (e.g., as a layer on top of a cloud scale database) that permits visual exploration of machine learning models. Visualizations can be based on relevant information (e.g., evaluation metrics) from machine learning model(s). Such relevant information can be logged (e.g., using a data store). In implementations, visualizations can represent the data meaningfully as a reader-board or as a chart. Reader-boards and/or charts can represent different types of metrics for different evaluators (e.g., used to evaluate a machine learning model).

Figure 2:
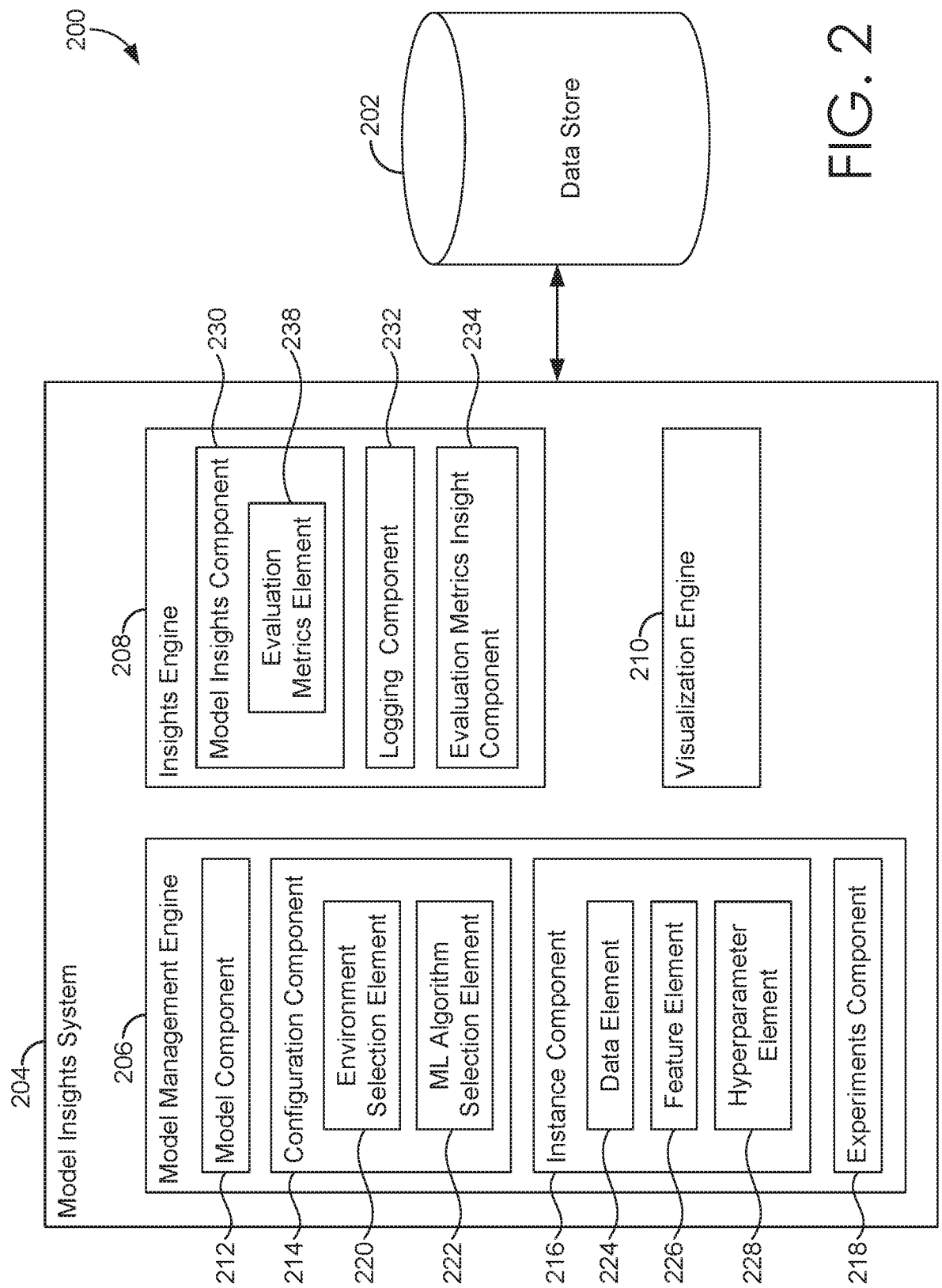
FIG. 2 depicts an example configuration of an operating environment in which some implementations of the present disclosure can be employed, in accordance with various embodiments of the present disclosure.

Referring to FIG. 2, aspects of an illustrative environment 200 for implementing model insights system 204 are shown, in accordance with various embodiments of the present disclosure. Model insights system 204 can be provided as part of a platform that allows users to analyze data related to, for example, machine learning models. Such a platform can include a workspace (e.g., model insights system 204) that allows users to analyze data using, for example, on visualizations. Such visualizations can provide insight based on evaluations of machine learning models. In implementations, model insights system 204 can generally be used to evaluate and provide insight for complex machine learning models that can be used to optimize the models at scale. In particular, the workspace can provide a framework for authoring and/or inputting machine learning models (e.g., and automatically provide runtime code used to evaluate models) and experimenting to fine-tune models. In accordance with embodiments described herein, the model insights system implemented as a framework can further provide rich insight visualizations.

In some embodiments, aspects of model insights system 204 can empower data scientists to quickly build effective and performant machine learning models at scale. Specifically, the model insights system can collect metrics indicative of machine learning model performance (e.g., standardized evaluation metrics). Iterations of a machine learning model can be analyzed by interpreting collected evaluation metric results. Such insights related to analyzed evaluation metric results associated with a machine learning model can be presented to a user via various visualizations (e.g., using a user interface). In this way, the model insights system provides data scientists with a framework that is cross-platform, extensible, and pluggable for building and evaluating the success of machine learning models. The model insights system further allows data scientists to evaluate and choose optimal machine learning models using displayed visualizations of relevant evaluation metrics associated with instances of configured machine learning models.

As displayed in FIG. 2, model insights system 204 includes model management engine 206, insights engine 208, and visualization engine 210. The foregoing engines of model insights system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the model insights system.

In implementations, model management engine 206 can interact with insights engine 208. Model management engine 206 can be used to input, select, modify, and/or train (e.g., run one or more instances) a machine learning model. For instance, model management engine 206 can be used to initiate, guide, and/or run model building and experimentation (e.g., of instances of a built model) in various machine learning environments (e.g., runtimes). Aspects of insights engine 208 can be used to provide and analyze evaluation metrics from iterations of machine learning models. Additionally, model management engine 206 and/or insights engine 208 can interact with visualization engine 210. Visualization engine 210 can be used to present information related to one or more iterations of a machine learning model. For example, visualization engine 210 can be used to present insights based on evaluation metrics related to one or more machine learning models and/or instances of a machine learning model (e.g., via a user interface).

Model management engine 206 can be used to input, modify, and/or train machine learning models. As depicted, model management engine 206 includes model component 212, configuration component 214, instance component 216, and experiments component 218. The foregoing components of model management engine 206 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components, engines, and/or systems.

In some embodiments, model management engine 206 (and/or portions of model management engine 206) can be provided as a SDK with embedded runtime frameworks related to multiple machine learning environments (e.g., coding or authoring languages). In some embodiments, the SDK can allow users to select and/or build machine learning models. For instance, the SDK can allow users to author machine learning models using provided frameworks. In other instances, a pre-built model can be selected for use (e.g., from a gallery of pre-built models).

Model component 212 can be used to write and/or receive an input a machine learning model. In implementations, a machine learning model can be comprised of logic for loading data, logic for performing a pipeline (e.g., training the model), logic for evaluating the model, and/or logic for scoring the built model. Such a machine learning model can be implemented using one or more coded functions. Such functions are written in a particular machine learning environment using an authoring language (e.g., Scala, R, Python, TensorFlow, etc.) In some embodiments, the model component can be used to author the code comprising a machine learning model.

In embodiments, model component 212 can be used to provide runtime code for evaluating a machine learning model. When a user submits and/or builds a machine learning model to the model management engine (or the model insights system), the model can be combined with runtime code (e.g., indicating what evaluation metrics should be collected during an experiment). Such runtime code can be based on various authoring languages (e.g., different coding languages) and/or machine learning model types (e.g., different algorithm types). For example, runtime code can relate to evaluating the model using standardized evaluation metrics. The model management engine can then execute the combined code during an experiment running an iteration of the machine learning model to collect standardized evaluation metrics.

Runtime code can be implemented as implicit or explicit runtime code. In embodiments using implicit runtime code, the application can provide code that can be directly integrated into code of a model. The directly integrated code can be used to generate evaluation metrics related to the model. The generated evaluation can then be received by the application to provide insights into the model. In embodiments using explicit runtime code, the application can provide code that can be executed alongside code of a built model. The code executed alongside the model can be used to extract evaluation metrics related to the model. As an example, explicit runtime code can be provided as co-located code. For instance, the co-located code can be implemented using a plug-in (e.g., a plug-in provided by insights engine 208). In this way, evaluation metric results for a machine learning model implementation created using model management engine 206 can be received or extracted using insights engine 208, as further discussed below.

In some embodiments, a user can provide one or more of the logic for loading data, logic for performing a pipeline, and logic for scoring the built model. The logic for evaluating the model can be provided by the model insights system as the runtime code (e.g., by model management engine 206 and/or insights engine 208, alone or in combination). For example, the logic for evaluating a model (e.g., runtime code) can be provided using a template to evaluate a model based on the authoring language and type of algorithm used to build the model. Information such as authoring language and type of algorithm can be received, for example, from configuration engine 214. The logic for evaluating a model can be used to analyze the output of a model to evaluate the success of the machine learning model. For example, evaluation of a machine learning model can be indicated using evaluation metrics.

As depicted, configuration component 214 includes environmental selection element 220 and ML algorithm selection element 222. The foregoing elements of configuration component 214 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various elements are depicted as separate elements, it should be appreciated that a single element can perform the functionality of all elements. Additionally, in implementations, the functionality of the elements can be performed using additional elements, components, engines, and/or systems.

In embodiments, configuration component 214 can be used to configure a machine learning model. Configuring a machine learning model can package the machine learning model into a form that can be used to create an instance of the model to be evaluated. For instance, in embodiments, the code comprising the machine learning model can be input, using a user interface (API) to create a built machine learning model. In particular, written code can be input using, for example, a user interface, and an API can then push out the code to generate a built machine learning model.

In some embodiments, configuration component 214 can work in conjunction with model component 212. For instance, environment selection element 220 of configuration component 214 can be used to select the authoring language used to build the model. Example model authoring languages include Scala, R, Python, and TensorFlow. Such information can be used to determine the form (code used) used to provide the code driven evaluation metrics (e.g., implicit or explicit runtime code) for the machine learning model. Additionally, the ML algorithm selection element 222 can be used to select the type of ML algorithm that the machine learning model is. Example ML algorithm types include regression, binary classification, multi-class classification clustering (with ground truth), clustering (without ground truth), recommendation, TensorFlow use cases, error capture mechanisms, others (that deviate from a provided list of machine learning algorithm types), etc. In this way, in embodiments, configuration component 214 can provide an evaluation metric template to model component 212 to incorporate into the machine learning model.

In other embodiments, templates for a machine learning model corresponding to loading data, logic for performing a pipeline, and logic for scoring the built model can be input into configuration component 214. Further, environment selection element 220 can be used to indicate the authoring language used to build the model and ML algorithm selection element 222 can be used to indicate the type of ML algorithm. Using this information, configuration component 214 can determine a corresponding evaluation metric template including logic for evaluating the model.

Code from model component 214 and code related to evaluation metrics can be packaged together, for example, using model component 212 and/or configuration component 214. Configuration component 214 can be used to push out the code and create a model specification. A model specification can include a built model, authoring language environment, and machine learning algorithm type. In instances, an API can be used to push out the code to create a template of the model specification.

In embodiments, configuration component can be used to generate a model specification for a desired machine learning algorithm. A model specification can be a machine learning model created, for example, by packaging the code of the model into, for example, a URL, selecting a model type, selecting a runtime type, and/or submitting built model to model insights system 204 (e.g., via configuration component 214). In other embodiments, the model component can be used to receive an input of previously authored code comprising a machine learning model.

Instance component 216 can be used to implement instances of a machine learning model As depicted, instance component 216 includes data element 224, feature element 226, and model element 228. The foregoing elements of instance component 216 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various elements are depicted as separate elements, it should be appreciated that a single element can perform the functionality of all elements. Additionally, in implementations, the functionality of the elements can be performed using additional elements, components, engines, and/or systems.

Data element 224, feature element 226, and hyperparameter element 228 can be used to configure instances of a machine learning model instance component 216. For example, data element 224 can be used to select and/or indicate the data being used to train the machine learning model. This allows a company to select and/or input in data about its customers and/or products to train a customized instance of the machine learning model. Expanding on the above-referenced product purchase prediction model specification for product purchase predication, a company (NIKE) can use its own data (e.g., about shoe sales and customers that purchases shoes) to build a custom model for product purchase prediction. Further, feature element 226 can be used to select features related to the data (e.g., a feature is a property of data that is being used to train the model). With regard to product purchase prediction, features can include day of the week, last 30 days purchases, etc.) In particular, a feature can be described as one column of the data in an input set. As an example, if a model is being built to predict the type of pet a person will choose, input features may include age, location of residence, job, etc. (e.g., where the output of such a model can be a label—i.e., dog, cat, fish, etc.). In addition, hyperparameter element 228 can be used to select and/or indicate hyperparameters/model layer parameters to comprise the machine learning model. Hyperparameters/model layer parameters can include the learning rate, number of epochs, number of hidden layers, hidden units, activation functions, convolution kernel width etc.

When creating an instance, model instance component 216 can be used to configure the machine learning model instance by modifying the data used to train the model (e.g., using data element 224), modifying the features of the model (e.g., using feature element 226), and modifying hyperparameters/model layer parameters of the model (e.g., using hyperparameter element 228).

Upon creating an instance of a machine learning mode, the model can be trained using experiments component 218. Each iteration of the model can be evaluated using evaluated metrics (e.g., the using evaluation metrics determined using configuration component 214). These evaluation metrics can be published to insights engine 208.

Model insights engine 208 can provide standardized templates (e.g., evaluation metrics) for evaluating machine learning models (e.g., based on the type of machine learning model and the machine learning environment). Such standardized templates can be implicit or explicit runtime code related to what evaluations metrics to collect for a particular model. In some embodiments, model insight engine 208 can receive extracted relevant information from model management engine 206 (e.g., metrics collected based on the template for evaluating the model). In other embodiments, model insight engine 208 can run alongside model management engine 206 and extract relevant information (e.g., evaluation metrics) from a model instance being trained using the model management engine. Further, insights engine 208 can be used to provide insights about a machine learning model based on the information received (e.g., evaluation metrics).

As depicted, insights engine 208 includes model insights component 230, logging component, and evaluation metrics insight component 234. The foregoing components of insights engine 208 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines.

Insights engine 208 can be used to collect and/or process evaluation metrics from instances of machine learning models. In some embodiments, insights engine 208 and/or portions of insights engine 208 (e.g., model insights component 230) can be used to implement a plug-in in conjunction with model management engine 206 (as discussed with reference to model management engine 206). In such an embodiment, model insights component 230 can interact with one or more components of model management engine 206 to extract relevant information related to evaluation metrics related to an instance of a machine learning model (e.g., executed using, for example, experiments component 218 of model management engine 206). In other embodiments, insights engine 208 and/or portions of insights engine 208 (e.g., model insights component 230) can be used to receive relevant information extracted using a plug-in, for example, implemented using model management engine 206. In such an embodiment, model insights component 230 can interact with one or more components of model management engine 206 to receive extracted relevant information related to evaluation metrics related to an instance of a machine learning model (e.g., executed using, for example, experiments component 218 of model management engine 206). In instances, evaluation metrics element 238 can interact with configuration component 214 to provide template evaluation metric information used run the machine learning model.

Evaluation metrics element 238 can contain information regarding machine learning algorithm types along with corresponding evaluation metrics. Evaluation metrics can be used to determine various aspects of a machine learning model (e.g., accuracy, precision, loss, etc.). For instance, for a regression machine learning algorithm type can be associated with various evaluation metrics including RMSE (root mean squared error), MAPE (mean absolute percentage error), MASE (mean absolute squared error), and MAE (mean absolute error). For instance, for a binary classification machine learning algorithm type can be associated with various evaluation metrics including confusion matrix, precision-recall, accuracy, F-score (F1, F2), AUC (area under curve), ROC (receiver operating characteristic). For instance, for a multi-class classification machine learning algorithm type can be associated with various evaluation metrics including confusion matrix (for each class), precision-recall, accuracy, and F-score (F1, F2). For instance, for a clustering (with ground truth) machine learning algorithm type can be associated with various evaluation metrics including NMI (normalized mutual information score), AMI (adjusted mutual information score), RI (Rand index), ARI (adjusted Rand index), homogeneity score, completeness score, V-measure, FMI (Fowlkes-Mallows index), purity, Jaccard index. For instance, for a clustering (without ground truth) machine learning algorithm type can be associated with various evaluation metrics including inertia, silhouette coefficient, CHI (Calinski-Harabaz index), DBI (Davies-Bouldin index), Dunn index. For instance, for a recommendation machine learning algorithm type can be associated with various evaluation metrics based on, for example, as a customized ground truth comparison. For instance, for a TensorFlow use cases machine learning algorithm type can be associated with various evaluation metrics using, for example, TensorFlow Model Analysis and TensorBoard. For instance, for other/error capture mechanism machine learning algorithm types can be associated with various evaluation metrics based on, for example, as a custom metric logic.

In embodiments, model insights component 230 can provide evaluation support in an implicit or explicit manner. When the model insights component is enabled as in implicit part of a machine learning model training workflow, a training driver (e.g., experiments component 218) from runtime (e.g., model management engine 206) to execute an evaluator implementation from built machine learning model created using configuration component 214 (e.g., using evaluation information received from evaluations metrics element 238). The generated evaluation metrics can then be published to insights engine 208. In embodiments, the evaluation metrics can be received by logging component 232. Logging component 232 can receive the evaluation metrics and store the history of model along with metadata and evaluation metrics (e.g., in data store 202).

Whatever evaluation metric results the model generates can be collected as part of the co-located code and published into an insights engine (e.g., insights engine 208). Evaluation metrics insight component 234 can be used to process the evaluation metric results. Insights can be based on the different metrics evaluated for the machine learning model. For instance, presenting and/or analyzing the evaluation metric results to provide insight into the machine learning model (e.g., accuracy of the model, precision of the model, accuracy of the model, etc.).

Visualization engine 210 can be used to present extracted relevant information (e.g., evaluation metrics) from model management engine 206 and logged using insights engine 208 for visualization (e.g., via a user interface). Such a visual interface can allow users to look at (e.g., compare) the results from one or more machine learning model and/or one or more iterations of a single machine learning model. In embodiments, visualization engine 210 can provide an easy-to-navigate user interface (e.g., as a layer on top of a cloud scale database) that permits visual exploration of machine learning models. Visualizations can be based on relevant information (e.g., evaluation metrics) from machine learning model(s). Such relevant information can be logged (e.g., using a data store). In implementations, visualizations can represent the data meaningfully as a reader-board or as a chart. Reader-boards and/or charts can represent different types of metrics for different evaluators (e.g., used to evaluate a machine learning model). Further, the visualization engine can be used to present the insights about a machine learning model determined by the insights engine (e.g., via a user interface).

As shown, a model insights system can operate in conjunction with data store 202. Data store 202 can store computer instructions (e.g., software program instructions, routines, or services), data, and/or models used in embodiments described herein. In some implementations, data store 202 can store information or data received via the various engines and/or components of model insights system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include machine learning models, instances of machine learning models (e.g., run as experiments), and/or evaluation metric results (e.g., from run experiments).

A machine learning model can be selected and run using on defined data, features, and/or hyperparameters. In embodiments, such defined data, features, and/or hyperparameters can be modified prior to running an experiment on an iteration of a model or after running one or more experiments on one or more iterations of the model.

When an instance of a machine learning model is run as an experiment, data store can log relevant information. Relevant information can include information about the machine learning model (e.g., algorithm type, authoring language, data, features, and/or hyperparameters). Relevant information can further include information about evaluation metrics used to evaluate the machine learning model. Additionally, relevant information can include information about evaluation metric results from evaluating the machine learning model (e.g., using the evaluation metrics).

In embodiments, data store 202 can include data. In embodiments, data can be training data used to generate the machine learning models. In other embodiments, data can be customer data (e.g., information gathered in real-time related to a customer and/or customer journey). In some cases, data can be received by model insights system 204 from customer devices (e.g., a customer's behavior history, customer profile, customer interactions, etc.). In other cases, data can be received from one or more data stores in the cloud.

Figure 3:
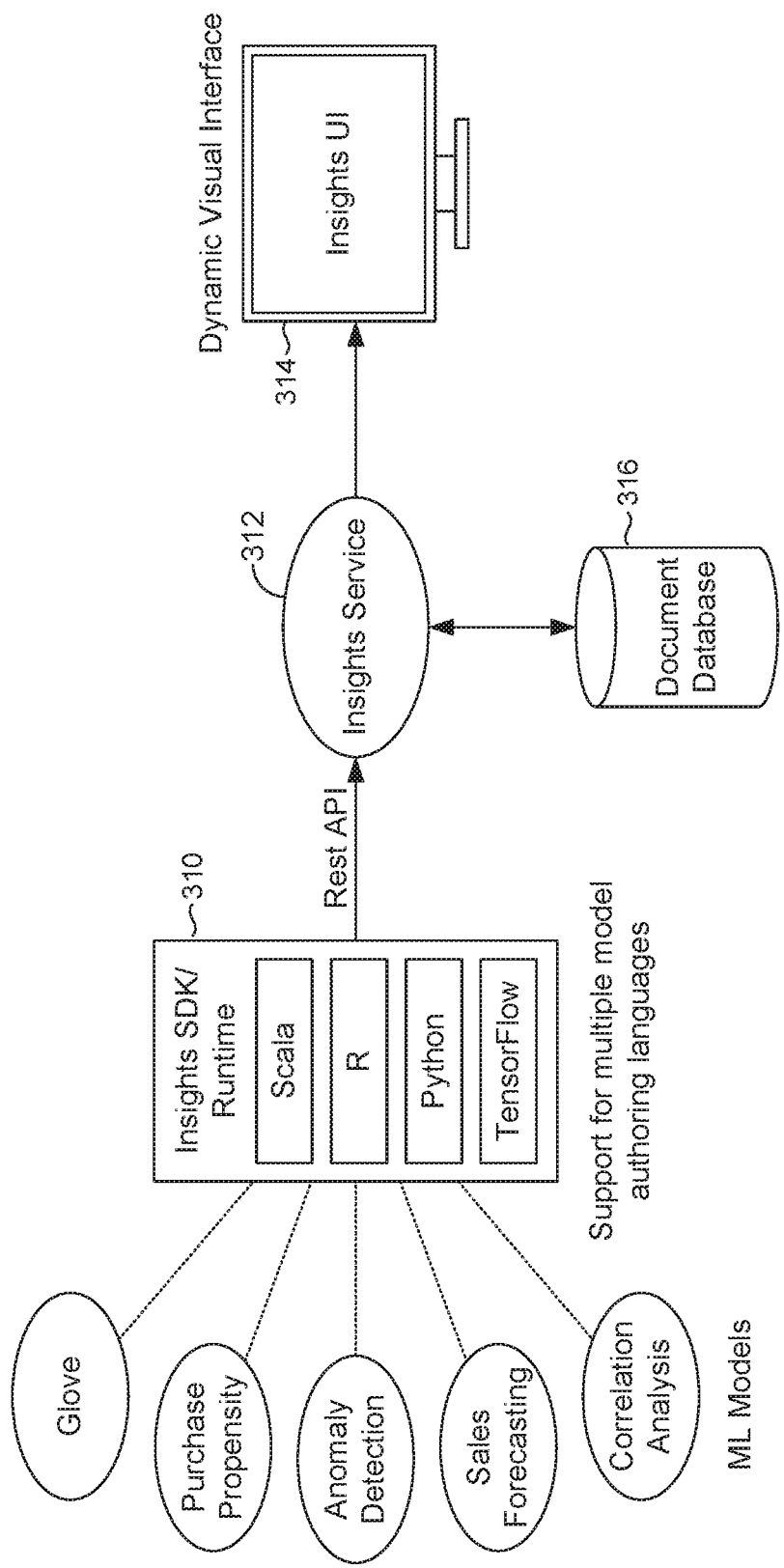
FIG. 3 an illustrative environment for implementing a model insights framework in accordance with embodiments of the present disclosure.

FIG. 3 depicts an illustrative environment for implementing a model insights framework in accordance with embodiments of the present disclosure. As illustrated, insights SDK can be embedded as part of a runtime framework 310 for multiple machine learning environments. Insights service 312 can be a backend service that defines key abstractions to persistence. Insights user interface 314 can be a web-based visualization interface. Out-of-the-box implementations can be provided for algorithm types including supervised, unsupervised, reinforcement, etc. in environments (e.g., based on various authoring languages) including SparkML, Python, R, and TensorFlow. Users can perform experimentation and model building in a preferred machine learning environment (e.g., authoring language). Behind the scenes, in one embodiment, the runtime framework 310 can automatically extract relevant information (e.g., evaluation metrics) and pass the information to the insights service 312. Runtime framework 310 can interact with insights service 312 using a REST API. Such a REST API allows any authoring language to be used to write the code of a machine learning model. Using a REST style architecture is advantageous because REST can allow the model insights framework to be extensible to multiple machine learning environments (e.g., multiple authoring languages to code the model). Code for evaluating the machine learning model can be provided and used to generate and/or extract evaluation metrics for the machine learning model. For instance, insights service 312 can receive the evaluation metrics. The insights service 312 can store the history of models along with metadata and key evaluation metrics. Such information can be stored, for example in document database 316. Insights user interface 314 can be a rich and dynamic visual interface that can adapt to models/algorithms. Such a user interface can provide an easy-to-navigate layer on top of a cloud scale database to permit visual exploration and the ability to analyze/interpret models and pipelines (e.g., stored as persistent data related to the history of models). Aspects of the model insights framework are open and pluggable (e.g., providing runtime code for collecting standardized evaluation metrics). This can allow for adding additional evaluation tools to the framework. In this way, other tools can be integrated into the framework to provide additional insights or interpretations.

Figure 4:
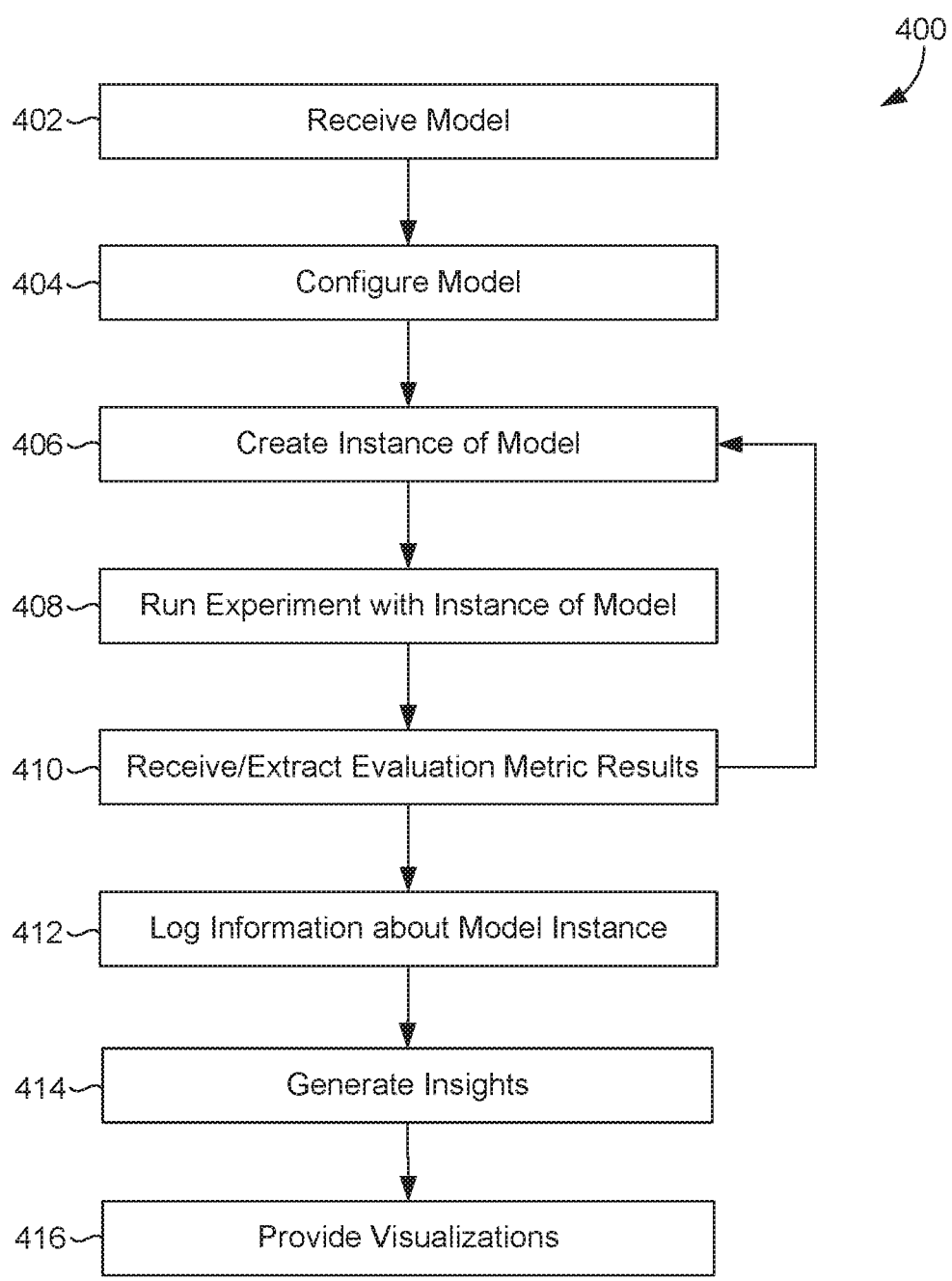
FIG. 4 illustrates a process flow depicting evaluating and providing insight related to a complex machine learning model using a model insights system, in accordance with embodiments of the present disclosure.

FIG. 4 illustrates a process flow 400 depicting an example of evaluating and providing insight related to a complex machine learning model using a model insights system, in accordance with embodiments of the present disclosure. In embodiments, process flow 400 can be implemented using, for example, model management engine 206, insights engine 208, and/or visualization engine 210 of model insights system 204, as discussed with reference to FIG. 2. In other instances, process flow 400 can be implemented using, for example, insights SDK/runtime 310, insights service 312, and/or dynamic visual interface 314, as discussed with reference to FIG. 3.

At 402, a model can be received. In instances, a user can author code for one or more of logics that comprise a machine learning model. Such code can comprise logic for training a built machine learning model. In authoring a model, various datasets can be leveraged and used for training the machine learning model. Further, runtime code for logic for evaluating a model can be provided as co-located code, for example, by a plug-in. Such runtime code can be based on various authoring languages and/or machine learning model types.

At 404, the model can be configured. Model configuration can include packaging the machine learning model into container. For instance, in embodiments, the code comprising the machine learning model can be input, using a user interface (API). Further, configuration can include selecting a model type. A model type can indicate the type of machine learning algorithm (e.g., regression, binary classification, multi-class classification, clustering (with ground truth), clustering (without ground truth) recommendation TensorFlow use, and/or other/error capture mechanism). In addition, configuration can include selecting a runtime type (e.g., an authoring language such as, for example, Scala, R, Python, TensorFlow, etc.). To configure a model, the code, model type, and runtime type can be submitted to generate a build model. In implementations, written code can be input using, for example, a user interface, and an API can then push out the code to generate the built model.

At 406, an instance of the model can be created. A model instance can be a variation of the built machine learning created by modifying various configurations of the model. For example, data used to train the model can be selected and/or indicated. This allows a company to select and/or input in data about its customers and/or products to train a customized instance of the machine learning model. Further, features related to the data can be selected (e.g., a feature is a property of data that is being used to train the model). In addition, hyperparameter/model layers can be selected and/or indicated. Hyperparameters/model layer parameters can include the learning rate, number of epochs, number of hidden layers, hidden units, activation functions, convolution kernel width etc.

Upon creating an instance of the model, an experiment can be run using the instance of the model at 408. Relevant information can be received and/or extracted from the model training experiment (e.g., evaluation metrics collected based on the logic for evaluating the model). In some embodiments (e.g., using implicit runtime code), a plug-in can run alongside the executing model code and extract relevant information (e.g., evaluation metrics) from a model instance. In other embodiments (e.g., using explicit runtime code), the relevant information can be received. In this way, evaluation metric results for a machine learning model implementation can be received or extracted at 410.

At block 410, evaluation metric results can be received and/or extracted by an insights engine. In embodiments, such an insights engine can be stored and run on a remote server. The evaluation metric results sent to the insights engine can be based on the output of a machine learning model. In some embodiments, co-located code can be provided by the insights engine to extract relevant information from a machine learning model instance. The evaluation metric results can be logged such that a history of machine learning models (e.g., metadata, key evaluation and interpretation metric, etc.) is stored as persistent data. In this way, the insights engine can track all model experiments through seamless integration with a machine learning framework on a cloud platform. Evaluation metric results can be received in real-, or near real-time (e.g., depending on backup at a server running the experiments).

Blocks 406 to 410 can be repeated for various instances of a model. At block 412, relevant information about model instances can be logged. In this way, the system can track the modifications made to the model and the how the modifications effect the success of the model (e.g., based on collected evaluation metrics). Relevant information can include information about the machine learning model (e.g., algorithm type, authoring language, data, features, and/or hyperparameters). Relevant information can further include information about evaluation metrics used to evaluate the machine learning model. Additionally, relevant information can include information about evaluation metric results from evaluating the machine learning model (e.g., using the evaluation metrics).

To compare iterations of the machine learning model, at block 414 insights can be provided. Insights can be based on the different metrics evaluated for the machine learning model. For instance, presenting and/or analyzing the evaluation metric results to provide insight into the machine learning model (e.g., accuracy of the model, precision of the model, accuracy of the model, etc.).

At block 416, evaluation metric and related insights can be provided as visualizations. Visualizations can be provided using, for example, a visual interface (e.g., user interface). Such a visual interface can allow users to look at the results from one or more machine learning model and/or one or more iterations of a single machine learning model. In embodiments, visualizations can be provided via an easy-to-navigate user interface (e.g., as a layer on top of a cloud scale database) that permits visual exploration of machine learning models. Visualizations can be based on relevant information (e.g., evaluation metrics) from machine learning model(s). Such relevant information can be logged (e.g., using a data store). In implementations, visualizations can represent the data meaningfully as a reader-board or as a chart. Reader-boards and/or charts can represent different types of metrics for different evaluators (e.g., used to evaluation a machine learning model).

Figure 5:
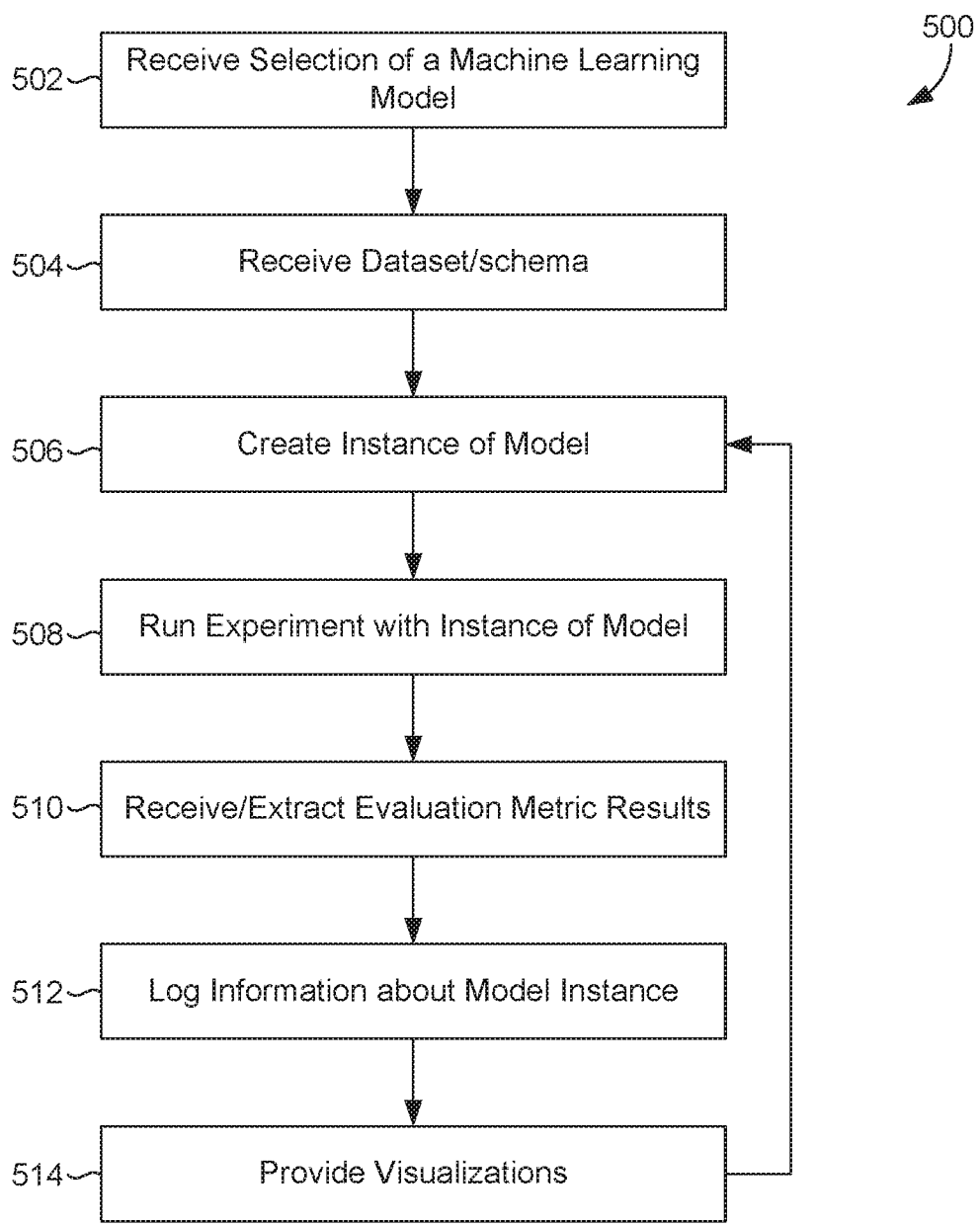
FIG. 5 illustrates a process flow depicting running and evaluating a complex machine learning model to provide insight into the model using a model insights system, in accordance with embodiments of the present disclosure.

FIG. 5 illustrates a process flow 500 depicting an example of running and evaluating a complex machine learning model to provide insight into the model using a model insights system, in accordance with embodiments of the present disclosure. In embodiments, process flow 400 can be implemented using, for example, model management engine 206, insights engine 208, and/or visualization engine 210 of model insights system 204, as discussed with reference to FIG. 2. In other instances, process flow 400 can be implemented using, for example, insights SDK/runtime 310, insights service 312, and/or dynamic visual interface 314, as discussed with reference to FIG. 3.

At block 502, a selection of a machine learning model can be received. For instance, the machine learning model can be selected from a gallery. In other instances, a machine learning model can be authored by a user.

At block 504, a dataset and/or schema can be received. The dataset and/or scheme can correspond to the selected machine learning model. Such a dataset can be related to a task that the machine learning model was created to perform (e.g., product purchase prediction). Further, the schema can be a schema that combines necessary data for running the machine learning model. Such a schema can be a pre-defined custom schema based on the information (e.g., data) needed to run the machine learning model.

At block 506, an instance of the machine learning model can be created. A model instance can be created by modifying various portions of the model. For example, data used to train the model can be selected and/or indicated. This allows a company to select and/or input in data about its customers and/or products to train a customized instance of the machine learning model. Further, features related to the data can be selected (e.g., a feature is a property of data that is being used to train the model). In addition, hyperparameter/model layers can be selected and/or indicated. Hyperparameters/model layer parameters can include the learning rate, number of epochs, number of hidden layers, hidden units, activation functions, convolution kernel width etc. In embodiments, configuration of a machine learning model can be kept as-is to create the instance. In other embodiments, the configuration of the machine learning model can be modified to create the instance.

Upon creating an instance of the model, an experiment can be run using the instance of the model at 508. Relevant information can be received and/or extracted from the model experiment (e.g., metrics collected based on the template for evaluating the model). In some embodiments, a plug-in can run alongside the executing model code and extract relevant information (e.g., evaluation metrics) from a model instance. In other embodiments, the relevant information can be received.

Evaluation metric results for a machine learning model instance can be received or extracted at 510. In embodiments, evaluation metric results can be received and/or extracted by an insights engine. Such an insights engine can be stored and run on a remote server. The evaluation metric results sent to the insights engine can be based on the output of a machine learning model. In some embodiments, co-located code can be provided by the insights engine to extract relevant information from a machine learning model instance. Evaluation metric results can be received in real-, or near real-time (e.g., depending on backup at a server running the experiments).

At block 512, relevant information about model instances can be logged. In this way, the system can track the modifications made to the model and the how the modifications effect the success of the model. Relevant information can include information about the machine learning model (e.g., algorithm type, authoring language, data, features, and/or hyperparameters). Relevant information can further include information about evaluation metrics used to evaluate the machine learning model. Additionally, relevant information can include information about evaluation metric results from evaluating the machine learning model (e.g., using the evaluation metrics). In this way, the evaluation metric results can be logged such that a history of machine learning models (e.g., metadata, key evaluation and interpretation metric, etc.) are stored as persistent data. In this way, the insights engine can track all model experiments through seamless integration with a machine learning framework on a cloud platform.

At block 514, visualizations can be provided. In instances, visualizations can be based on evaluation metric results, insights, and/or interpretations. Visualizations can be provided using, for example, a visual interface (e.g., user interface). Such a visual interface can allow users to look at the results from one or more machine learning model and/or one or more iterations of a single machine learning model. In embodiments, visualizations can be provided via an easy-to-navigate user interface (e.g., as a layer on top of a cloud scale database) that permits visual exploration of machine learning models. Visualizations can be based on relevant information (e.g., evaluation metrics) from machine learning model(s). Such relevant information can be logged (e.g., using a data store). In implementations, visualizations can represent the data meaningfully as a reader-board or as a chart. Reader-boards and/or charts can represent different types of metrics for different evaluators (e.g., used to evaluation a machine learning model). Blocks 506 to 514 can be repeated for various instances of a model.

Figure 6:
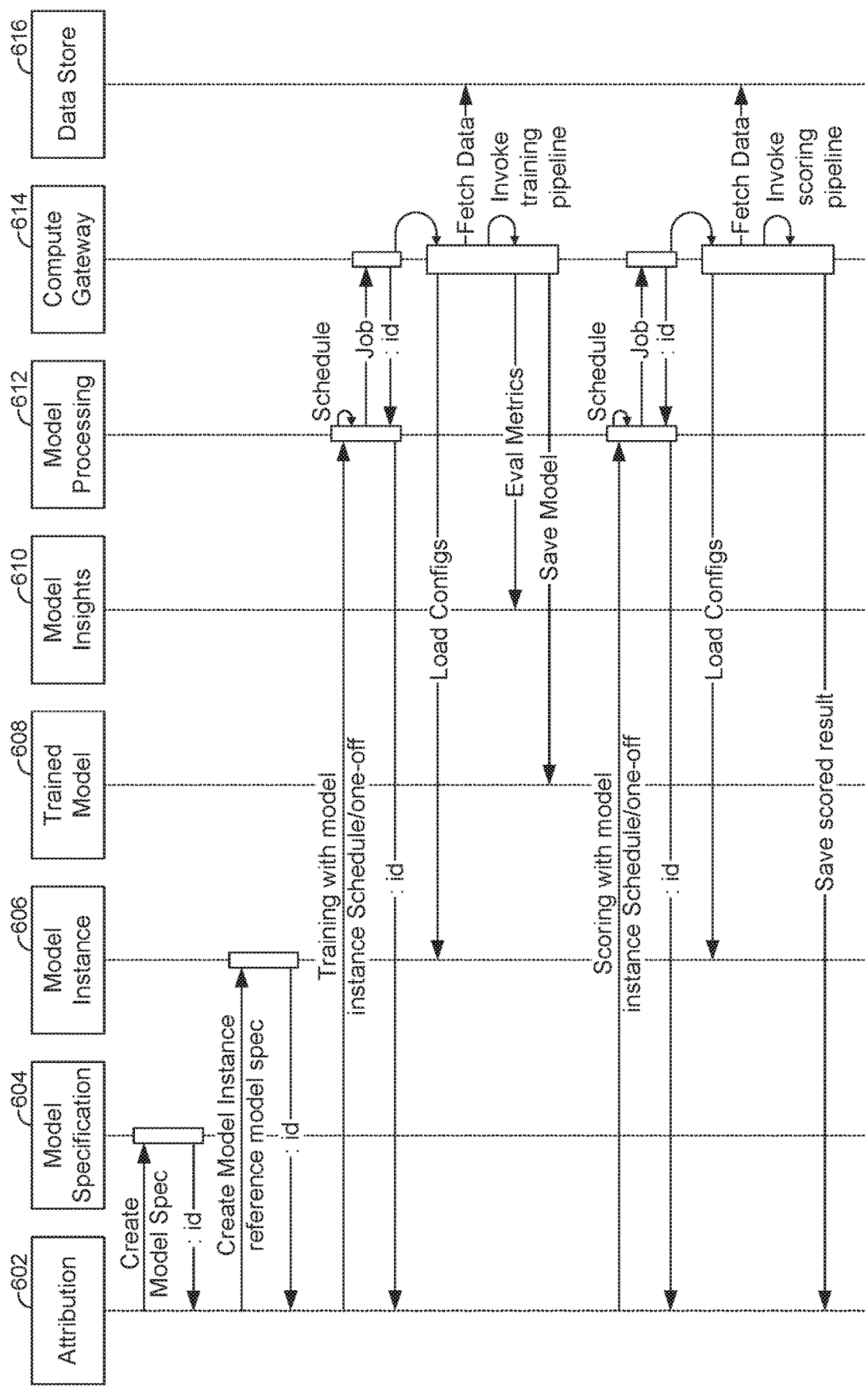
FIG. 6 depicts an exemplary flow diagram illustrating a method for implementing a model insights framework, in accordance with embodiments of the present disclosure.

Turning now to FIG. 6, an exemplary flow diagram illustrating a method for implementing a model insights framework is generally depicted, in accordance with embodiments of the present disclosure. The flow diagram includes attribution 602, model specification 604, model instance 606, trained model 608, model insights framework 610, model processing 612, compute gateway 614, and data store 616.

Initially, attribution 602 can interact with model specification 604 to create a model specification. By way of example, a user can select a pre-built model (e.g., from a gallery of pre-built models). As a further example, a user can author a model from scratch. In an embodiment, an API/UI (e.g., at attribution 602) can be used to push out code of the model and create a model specification (e.g., at model specification 604). Using the model specification, at model instance 606, a model instance can be created.

Attribution 602 can then send the model instance to model processing 612 for training using the model instance. To run training for the model instance, the model instance is submitted as a job to compute gateway 614. Compute gateway 614 can be powered using backend service (e.g., a platform for running long-term web services). To run training, compute gateway 614 can obtain the model instance (e.g., from attribution 602) and the configurations of the instance (e.g., from model instance 606). Such configurations can be based on the parameters of the machine learning model (e.g., data, features, hyperparameters). For example, data used to train the model can be selected and/or indicated, features related to the data can be selected (e.g., a feature is a property of data that is being used to train the model), and hyperparameter/model layers can be selected and/or indicated (e.g., learning rate, number of epochs, number of hidden layers, hidden units, activation functions, convolution kernel width etc.). Compute gateway 614 can fetch data from data store 616 (e.g., data designated for a machine model instance). Using the model instance, the model configurations, and the data, compute gateway 614 can invoke a training pipeline to run the training of the model. While compute gateway 614 runs the training of the model instance, model insights framework 610 can receive and/or extract evaluation metric results from the model. Upon completion of training, the model instance can be saved at trained model 608.

This process can be repeated for scoring the model instance. Attribution 602 can then send the model instance to model processing 612 for scoring using the model instance. To run scoring for the model instance, the model instance is submitted as a job to compute gateway 614. Compute gateway 614 can be powered using backend service (e.g., a platform for running long-term web services). To run training, compute gateway 614 can obtain the model instance (e.g., from attribution 602) and the configurations of the instance (e.g., from model instance 606). Such configurations can be based on the parameters of the machine learning model (e.g., data, features, hyperparameters). Compute gateway 614 can fetch data from data store 616 (e.g., data designated for a machine model instance). Using the model instance, the model configurations, and the data, compute gateway 614 can invoke a scoring pipeline to run the scoring of the model. While compute gateway 614 runs the scoring of the model instance, attribution 602 can save the scored result.

Figure 7A:
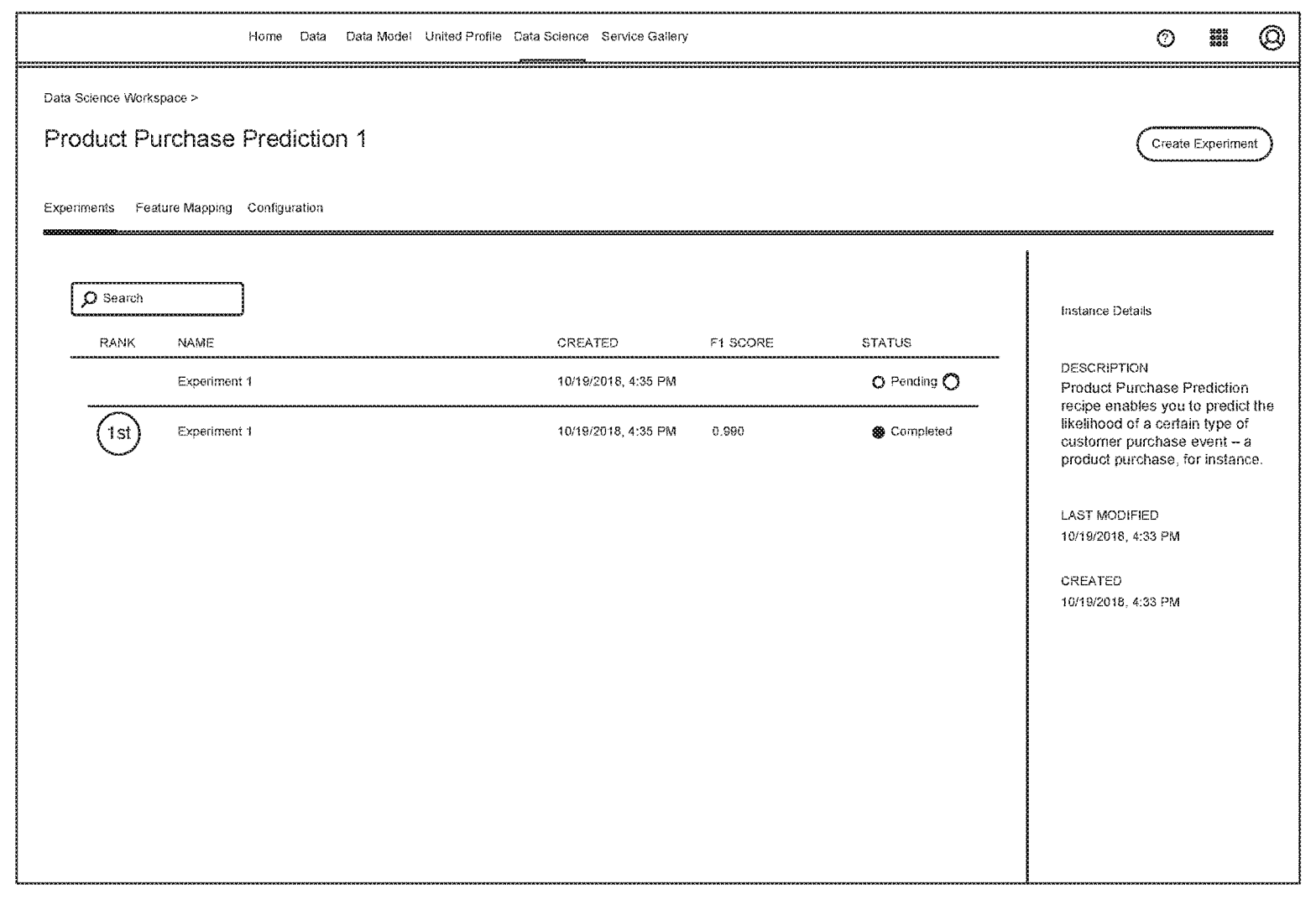
Figure 7B:
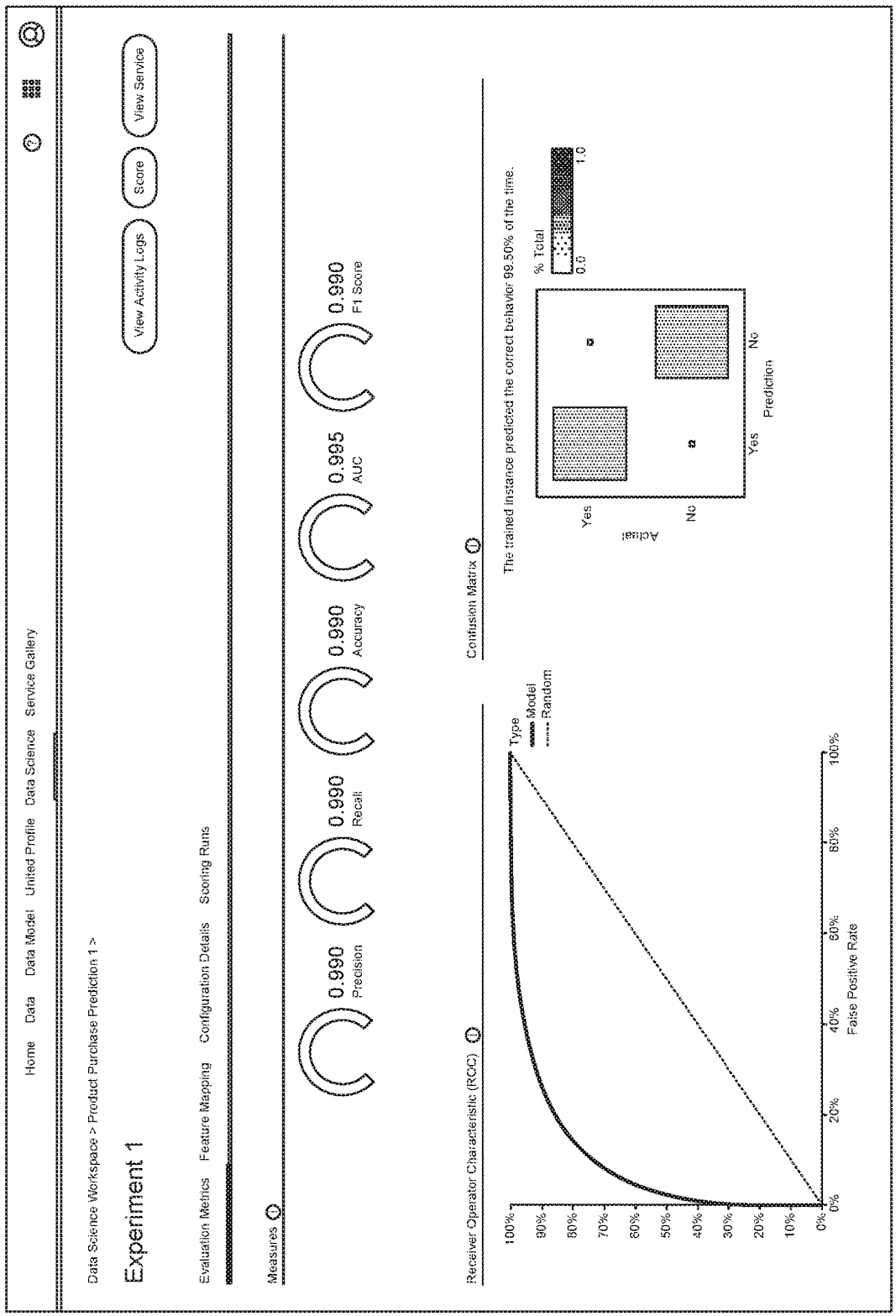

FIGS. 7A-7C depict an illustrative model insights system for providing insight for complex machine learning models at scale, in accordance with embodiments of the present disclosure. In embodiments, such a model insights system can be implemented using, for example, model management engine 206, insights engine 208, and/or visualization engine 210 of model insights system 204, as discussed with reference to FIG. 2. In other instances, such a model insights system can be implemented using, for example, insights SDK/runtime 310, insights service 312, and/or dynamic visual interface 314, as discussed with reference to FIG. 3.

FIG. 7A illustrates an interface that provides information about experiments. For example, an experiment can be pending or completed. For completed experiments, rank and evaluations metric results can be provided (e.g., F1 score). Rank can indicate the success of instances of the model. F1 score can be a measure of the accuracy of an experiment.

FIG. 7B illustrates an interface that provides insight about an instance of a model from an experiment. An Evaluation Metrics tab can provide information related to the evaluation metrics used to evaluate the model and the results of the metrics. For instance, F1 score can measure the accuracy of the experiment. As illustrated, other measures are provided. Such measures can use a combination of predicted results from the model as compared with real results (e.g., ground truth results). For instance, precision is a measure of how often is the model prediction correct. Recall is a measure of how often was the model correct in its prediction. Accuracy can use true positives and true negatives to measure how often the classifier model is correct. The ROC Curve can compare true positives and false positives to display a curve. The dotted line in the middle is a chance-curve. The chance-curve is the expected guessing result of the model, the goal of the model is to perform better than a 1 out of 2 change of being correct. In this way, the more the ROC curve targets the upper left corner, the better the model. The confusion matrix can compare actual, real results against predicted results. For instance, the confusion matrix can compare true positives, true negatives, false positives, and false negatives. As illustrated, the confusion matrix predicted yes for a number of times but made some mistakes. Overall, the model predicted the correct behavior 99.5% of the time.

FIG. 7C illustrates an interface that allows for using output of a model in real-time activation use-cases. Such a model can be, for example, the Product Purchase Prediction model as discussed above. A service can be built and activated, using the model, such that marketers can use the output of the model in real-time activation use-cases. In such a service, a dataset can be provided that contains the data for the model and contains data related to customers that have not bought a specific product (e.g., a backpack).

Figure 8:
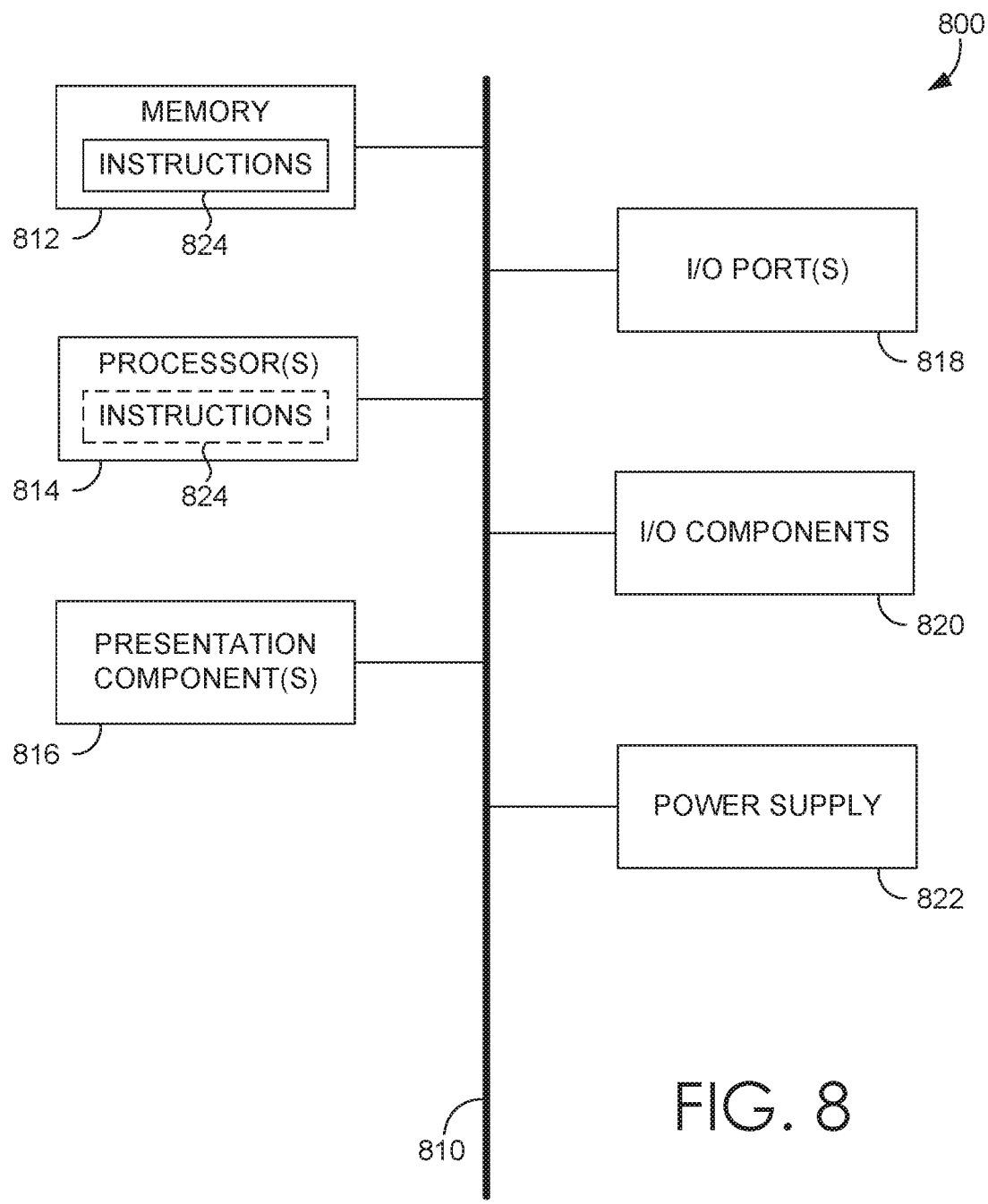
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
    obtaining a machine learning model associated with a model type and an authoring language;
    determining a logic, from among a set of logic, comprising a particular runtime code to evaluate the machine learning model using standardized evaluation metrics, the logic being determined based on the model type of the machine learning model and the authoring language of the machine learning model and being optimized for evaluating the machine learning model;
    integrating the particular runtime code into code of the machine learning model;
    obtaining an instance of the machine learning model with the logic, wherein the instance includes a set of parameters for the machine learning model;
    running an experiment to train the instance of the machine learning model with the logic to collect the standardized evaluation metrics;
    during the running of the experiment to train the instance of the machine learning model, receiving the standardized evaluation metrics related to the model type of the machine learning model, the standardized evaluation metrics collected based on the logic integrated with the machine learning model;
    storing relevant information associated with the instance of the machine learning model with the logic, the relevant information including information related to the machine learning model and information related to the standardized evaluation metrics collected based on the logic integrated with the machine learning model;
    analyzing the standardized evaluation metrics, wherein the analyzed standardized evaluation metrics provide insight into the instance of the machine learning model, wherein at least one insight indicates how a modification made to the machine learning model effects the success of the machine learning model based on the relevant information; and providing a user interface for visualizing the at least one insight indicating how the modification made to the machine learning model effects the success of the machine learning model.

2. The computer-implemented method of claim 1, the method further comprising:
providing the analyzed standardized evaluation metrics for visualization.

3. The computer-implemented method of claim 1, the method further comprising:
running a second experiment for a second instance of the machine learning model;
analyzing additional evaluation metrics related to the second instance of the machine learning model; and
generating additional insight related to the second instance of the machine learning model based on the additional evaluation metrics.

4. The computer-implemented method of claim 1, wherein receiving the standardized evaluation metrics related to the machine learning model is via a plug-in, wherein the plug-in provides the logic.

5. The computer-implemented method of claim 4, wherein the plug-in extracts the standardized evaluation metrics.

6. The computer-implemented method of claim 1, wherein the set of parameters comprise data, features, and hyperparameters.

7. The computer-implemented method of claim 1, wherein the user interface further provides for visualizing at least one of the standardized evaluation metrics.

8. The computer-implemented method of claim 3, the method further comprising:
providing a user interface for visualizing the additional insight related to the second instance of the machine learning model based on the additional evaluation metrics.

9. The computer-implemented method of claim 1, the method further comprising:
interpreting evaluation metrics to analyze the machine learning model; and
providing analyzations of the machine learning model to a user.

10. The computer-implemented method of claim 1, wherein the standardized evaluation metrics are used in association with a different machine learning model associated with a different authoring language or a different model type.

11. A non-transitory computer-readable storage medium including instructions which, when executed by a computer, cause the computer to perform operations comprising:
receiving a selection of a first machine learning model associated with a first authoring language;
selecting a first logic comprising a runtime code to evaluate the first machine learning model using standardized evaluation metrics, the first logic being selected based on the first authoring language and optimized for evaluating the first machine learning model;
creating an instance of the first machine learning model having the first logic integrated with the machine learning model, wherein the instance includes a first set of parameters for the first machine learning model;
running an experiment to train the instance of the first machine learning model;
during the running of the experiment to train the instance of the first machine learning model, receiving first evaluation metrics related to the first machine learning model, the first evaluation metrics generated based on the first logic;
receiving a selection of a second machine learning model associated with a second authoring language;
selecting a second logic comprising a runtime code to evaluate the second machine learning model using the standardized evaluation metrics, the second logic being selected based on the second authoring language and optimized for evaluating the second machine learning model;
creating an instance of the second machine learning model combined with the second logic, wherein the instance includes a second set of parameters for second machine learning model;
running an experiment to train the instance of the second machine learning model;
during the running of the experiment to train the instance of the second machine learning model, receiving second evaluation metrics related to the second machine learning model, the second evaluation metrics generated based on the second logic;
analyzing the first evaluation metrics, the second evaluation metrics, and one or modifications associated with the first machine learning model and/or the second machine learning model;
based on the analysis, generating at least one insight indicating how a modification made to the first machine learning model and/or second machine learning model effects success thereof; and
causing display of the at least insight.

12. The non-transitory computer-readable storage medium of claim 11, further comprising:
providing the analyzed first evaluation metrics and the second evaluation metrics for visualization.

13. The non-transitory computer-readable storage medium of claim 11, further comprising:
running a second experiment for a second instance of the first machine learning model;
collecting additional evaluation metrics related to the second instance of the first machine learning model; and
generating additional insight related to the second instance of the first machine learning model based on the additional evaluation metrics.

14. The non-transitory computer-readable storage medium of claim 11, wherein receiving the first evaluation metrics related to the first machine learning model is via a plug-in, wherein the plug-in provides the first logic.

15. The non-transitory computer-readable storage medium of claim 14, wherein the plug-in extracts the first evaluation metrics.

16. The non-transitory computer-readable storage medium of claim 11, wherein the first set of parameters comprise data, features, and hyperparameters.

17. The non-transitory computer-readable storage medium of claim 11, further comprising:
providing a user interface for visualizing at least one of the first evaluation metrics to provide the insight into the instance of the first machine learning model and the first set of parameters for the instance of the first machine learning model.

18. A computer system comprising:

one or more processors; and one or more computer storage media storing computer-useable instructions that, when used by the one or more processors, causes the computer system to perform operations comprising:

obtaining a machine learning model associated with a model type and an authoring language;

determining a logic, from among a set of logic, comprising a particular runtime code to evaluate the machine learning model using standardized evaluation metrics, the logic being determined based on the model type of the machine learning model and the authoring language of the machine learning model and being optimized for evaluating the machine learning model;

integrating the particular runtime code into code of the machine learning model;

obtaining an instance of the machine learning model with the logic, wherein the instance includes a set of parameters for the machine learning model;

running an experiment to train the instance of the machine learning model with the logic to collect the standardized evaluation metrics;

during the running of the experiment to train the instance of the machine learning model, receiving the standardized evaluation metrics related to the model type of the machine learning model, the standardized evaluation metrics collected based on the logic integrated with the machine learning model;

storing relevant information associated with the instance of the machine learning model with the logic, the relevant information including information related to the machine learning model and information related to the standardized evaluation metrics collected based on the logic integrated with the machine learning model;

analyzing the standardized evaluation metrics, wherein the analyzed standardized evaluation metrics provide insight into the instance of the machine learning model, wherein at least one insight indicates how a modification made to the machine learning model effects the success of the machine learning model based on the relevant information; and providing a user interface for visualizing the at least one insight indicating how the modification made to the machine learning model effects the success of the machine learning model.

19. The computer system of claim 18, the operations further comprising:

providing the analyzed standardized evaluation metrics for visualization.

20. The computer system of claim 18, the operations further comprising:

running a second experiment for a second instance of the machine learning model; analyzing additional evaluation metrics related to the second instance of the machine learning model; and generating additional insight related to the second instance of the machine learning model based on the additional evaluation metrics.

* * * * *